F. T. RAMSEY.
VEHICLE.
APPLICATION FILED JAN. 14, 1913.

1,138,148.

Patented May 4, 1915.
2 SHEETS—SHEET 1.

Witnesses:
Christ Feinle Jr.
D. W. Gould.

Inventor,
F. T. Ramsey.
By Victor J. Evans,
Attorney.

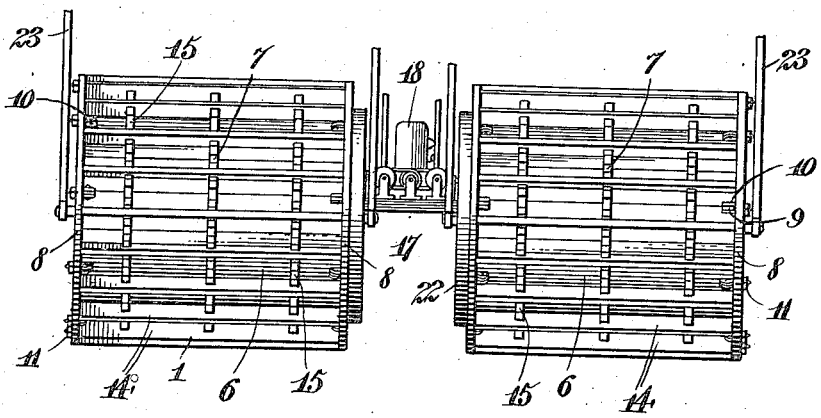
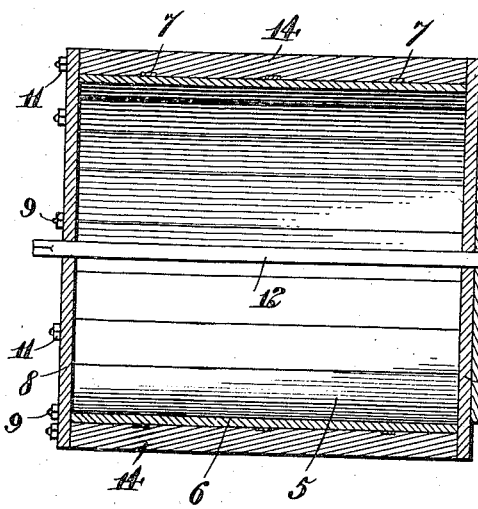
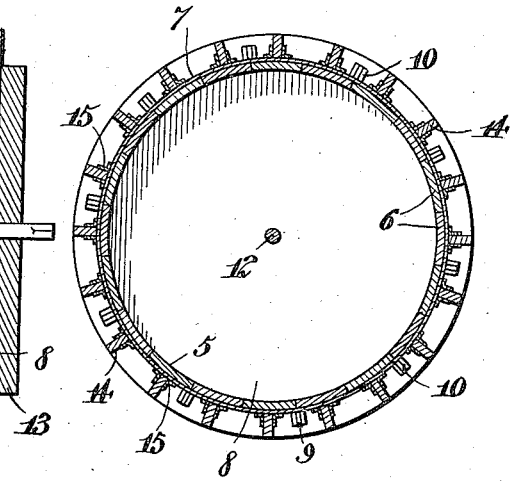

UNITED STATES PATENT OFFICE.

FRANK T. RAMSEY, OF AUSTIN, TEXAS.

VEHICLE.

1,138,148.

Specification of Letters Patent.   Patented May 4, 1915.

Application filed January 14, 1913.   Serial No. 741,977.

*To all whom it may concern:*

Be it known that I, FRANK T. RAMSEY, a citizen of the United States, residing at Austin, in the county of Travis and State of Texas, have invented new and useful Improvements in Vehicles, of which the following is a specification.

This invention relates to an improved vehicle designed particularly for travel through the water but adapted through the peculiarity of its construction for travel with practically equal facility on the land.

The main object of the present invention is the provision of a vehicle including a series of hollow supporting members in the form of drums, which are exteriorly provided with radially projecting paddle members for propelling the structure through the water, the heads of the drums having a diameter coextensive with the circumferential plane of the free edges of the paddles so that said heads will operate as wheels for the travel of the structure over the land.

The invention in its preferred form of details will be described in the following specification, reference being had to the accompanying drawings, in which:—

Figure 1:
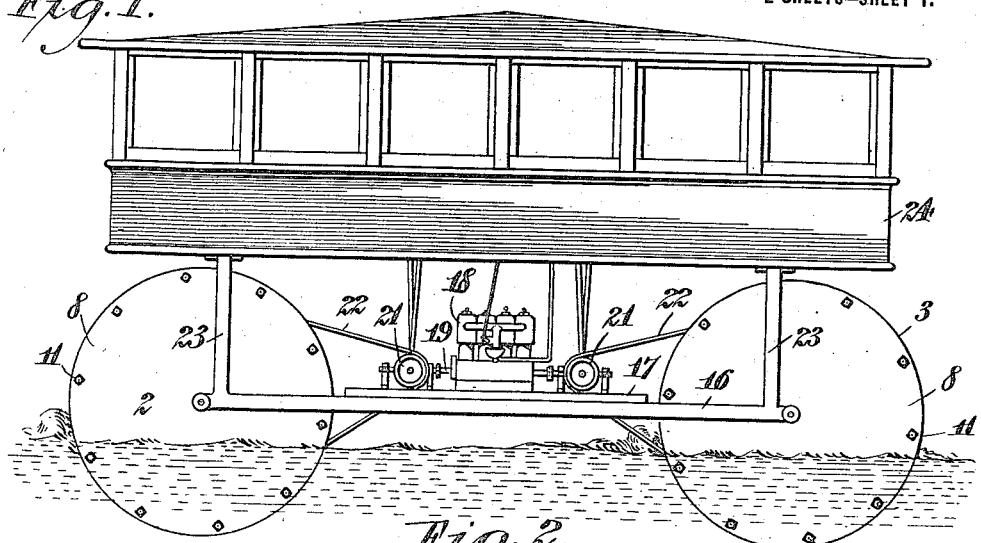
Figure 2:
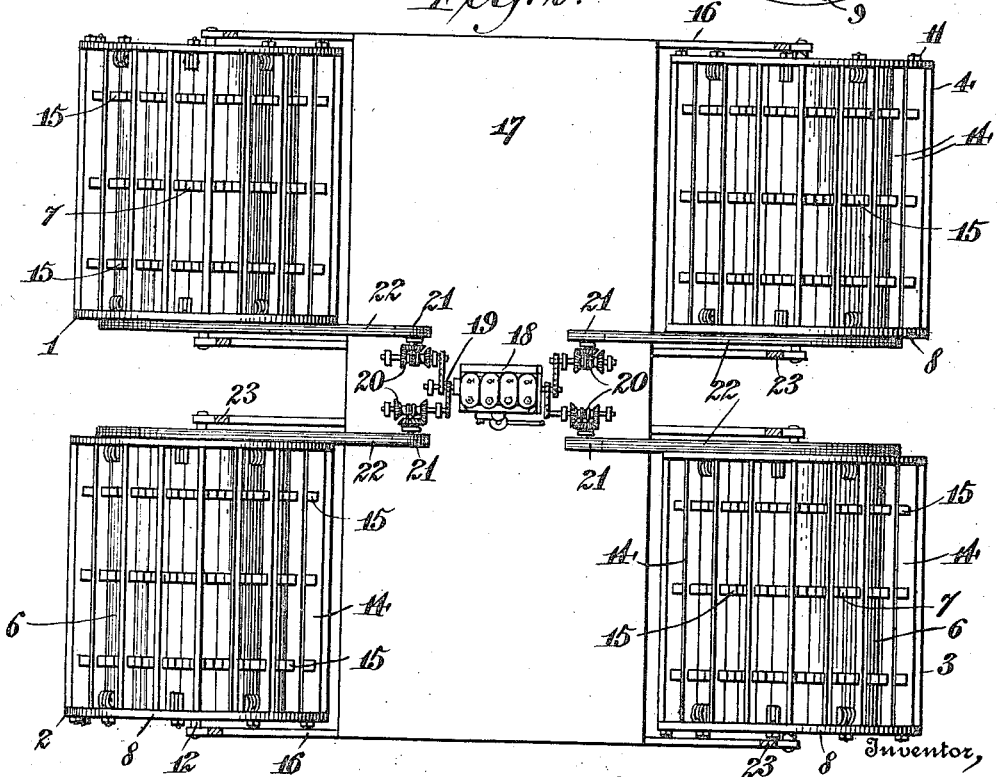

Figure 1 is a view in side elevation of the improved vehicle. Fig. 2 is a plan view of the same with the superstructure removed. Fig. 3 is an end elevation with the superstructure removed. Fig. 4 is a vertical longitudinal sectional view through one of the drums. Fig. 5 is a transverse sectional view through one of the drums.

Referring particularly to the accompanying drawings, my improved vehicle includes drums 1, 2, 3 and 4 arranged preferably in transversely alined pairs.

While preferring four drums as the supporting means, it is obvious that a greater or less number may be employed with equal facility and I do not in any way limit myself to any particular number of drums for this purpose.

The drums are of identical construction and the detail description of one will suffice for all. Each drum 5,—and there may be any number of these drums,—have the end members spaced apart a distance approximately equal to the length of drum desired. The drums 5 include a series of staves 6 joined together in any appropriate way as by hoops 7 or the like and forming a hollow body of uniform diameter throughout, the staves being of such material and so connected as to present a surface impervious to the passage of water.

To each end of the drum is secured a head 8 having a diameter somewhat greater than the similar dimension of the drum and preferably, though not necessarily, secured to the drum by bolts 9 removably fitting in slotted holders 10 secured on the drum and passing through the head to receive a nut 11 beyond the head. The drum is preferably formed with a circular recess concentric with the edge of the head and of a diameter to receive the end formed by the connected staves, so that with the heads in position at the ends of the drum and secured thereto as described the drum as an entirety presents a hollow body sealed against the admission of water.

A shaft 12 passes through each drum forming the axis therefor and a belt wheel 13 is secured to the head whereby rotation of the drum about its axis is obtained. On the outer surface of the drum extending lengthwise thereof and projecting radially from each surface is a series of paddles 14, said paddles comprising blade-like members having a width radially of the drum corresponding to the extent of the projection of the marginal edge of the head beyond the outer surface of the drum. The paddles are secured to the drum in any appropriate manner, fastenings 15 being illustrated to indicate any desired type of securing means, the paddles being preferably beyond the surface of the staves and being in any desired number. The important feature of the construction and the sole detail to which I desire to limit it in this particular is the relative arrangement of the paddle and drum heads so that the free circumferential edges of the heads are in alinement with the extreme upper edges of the paddle.

As previously described, the preferred arrangement is for four drums arranged in forward and rear pairs, under which circumstances the axles 12 of the drums will be connected at their outer or free ends by longitudinally extending supporting bars 16, said bars joining the outer axles of the respective longitudinally alined drums. The frame bars 16 support a platform or deck 17 which is arranged between the respective pairs of drums, forming a flooring for the support of the operating means. As to the operating means I do not desire to be limited in any particular and will simply describe the same by stating that I contemplate the use of a motor 18, such as a gasolene engine designed to operate a main shaft 19 to which shaft are connected by any desired type of reversing means 20 independent belt wheels 21. The belt wheels correspond in number to the drums and each belt wheel is connected to its particular drum through the medium of a belt 22. By the motor mechanism described it will be apparent that I contemplate, by the reversible control described the driving of all drums simultaneously in one direction or the driving of any particular drum or drums alone for the independent reverse driving of any combination of the drums. For example, it will be apparent that if drums 1, 2 and 4 are driven in one direction and drum 3 in the reverse direction a simple means for control of the direction of travel of the vehicle is provided, while if drums 2 and 3 are driven in reverse directions the vehicle can be made to turn almost in its length.

Uprights 23 rising from the bars 16 and from the platform 17 are arranged in any appropriate number to support a superstructure 24 which may be provided to present different compartments or arranged in any way desired to conveniently house and protect the passengers or others, the superstructure forming no important part of the structure except in that it makes provision for a convenient housing or cabin usual in vehicles of this type.

In the use of the vehicle in the water it will be obvious that the drums operate as floats to support the main deck superstructure and that in the rotation of the drums under the motive power the paddles will operate to propel the boat through the water. In this connection in rapid travel on the water the drum heads will operate as stops to limit the spread of the water and hence the agitation of the water which will be otherwise induced by the leading drum is not transmitted to the rear drum to materially effect the propelling power of the latter. The projecting portions of the head have another important function in the use of the vehicle as a land traveler in that said heads operate as wheels with the edges of the paddles as supporting surfaces between the engaging edges of the heads, so that the drums may be caused to travel over the land without liability of injury to the paddles. The vehicle thus provided is adapted without change for travel on the water or land and thereby in its use as a boat has material advantages as it can readily pass over shallow places in a stream, or can travel to the shore of a stream and out upon a sloping shore for loading or to escape the injuries incident to storms.

I do not desire to be understood as limiting the diameter of the heads of the drums to that of the circumferential diameter of the free edges of the baffles, for under some conditions heads of greater diameter are desired. It is also to be understood that no limitation is intended as to the number of drums, as it is readily apparent that two could be used arranged abreast or in tandem and that the stave construction is not primarily essential as any material could be made clearly serviceable arranged in any appropriate form.

What is claimed is:—

A propelling drum for land and water vehicles including a hollow cylindrical body made of a series of staves, a series of metallic strips encircling said staves for preventing outward movement thereof, heads, bolts for securing the heads to the ends of said staves, paddles positioned on said drums and contacting at their ends with said heads, L-shaped fasteners securing said paddles to said hoops, and means for rotating said drums.

In testimony whereof I affix my signature in presence of two witnesses.

FRANK T. RAMSEY.

Witnesses:
 PAUL O. SIMMS,
 H. A. ROBBINS.